United States Patent [19]

Murata

[11] 4,371,492

[45] Feb. 1, 1983

[54] METHOD OF MANUFACTURING ELECTRODE SUPPORTING BASE PLATE FOR RADIATION DETECTOR

[75] Inventor: Moriyoshi Murata, Otawara, Japan

[73] Assignee: Tokyo Shibaura Denki Kabushiki Kaisha, Japan

[21] Appl. No.: 302,698

[22] Filed: Sep. 15, 1981

[30] Foreign Application Priority Data

Sep. 17, 1980 [JP] Japan ............................ 55/128848

[51] Int. Cl.³ ............................................ B29C 1/02

[52] U.S. Cl. .................................... 264/226; 264/257

[58] Field of Search ................ 264/225, 226, 257, 2.5

[56] References Cited

U.S. PATENT DOCUMENTS

| | | | |
|---|---|---|---|
| 2,316,143 | 4/1943 | Peebles et al. | 264/226 |
| 3,472,809 | 10/1969 | Hardman | 264/225 |
| 4,031,396 | 6/1977 | Whetten et al. | |
| 4,119,853 | 10/1978 | Shelley et al. | |
| 4,123,657 | 10/1978 | Krippner et al. | |
| 4,271,589 | 6/1981 | Gudorf | 264/225 |

*Primary Examiner*—James B. Lowe

*Attorney, Agent, or Firm*—Finnegan, Henderson, Farabow, Garrett & Dunner

[57] ABSTRACT

A method is provided for manufacturing an electrode supporting base plate of a radiation detector wherein a plurality of high-voltage electrodes and signal detecting electrodes are alternately arranged at equal intervals and detection signals of incident radiation are obtained from the signal detecting electrodes. According to this method, a master of the base plate is processed at high precision from a material which allows easy processing and which has a small thermal expansion coefficient. A transfer mold is prepared by transferring a pattern of the master on an elastic molding material. A resin is injected in the transfer mold to manufacture an electrode supporting base plate.

7 Claims, 10 Drawing Figures

METHOD OF MANUFACTURING ELECTRODE SUPPORTING BASE PLATE FOR RADIATION DETECTOR

BACKGROUND OF THE INVENTION

The present invention relates to a method for manufacturing an electrode supporting base plate for a radiation detector used in a tomography device.

A device called a computerized tomography device (to be referred to as a CT device hereinafter for brevity) as a tomography device is known. In a CT device of this type, as shown in FIG. 1, an X-ray source 1 for radiating in a pulsed manner a divergent X-ray beam FX extending in the form of a flat circular section opposes, through a subject 3, a radiation detector 2 having an array of radiation detecting cells for detecting the X-ray beam FX. The radiation detector 2 collects X-ray absorption data in various directions with respect to the subject 3 by rotating the X-ray source 1 and the radiation detector 2 in synchronism in the same direction about the subject 3.

After collecting sufficient data, this data is analyzed with a computer to calculate the X-ray absorption ratios at individual positions with respect to the subject. Then, the scanning section of the subject is reconstituted with a gradation corresponding to the absorption ratios. Since the analysis may be accomplished with a gradation of as many as 2,000 steps according to the composition, a desired tomography image of soft to hard tissue may be obtained.

For collection of the X-ray absorption data, the radiation detector 2 detects by A-D conversion the ionizing current from the X-ray energy which has been transmitted through the subject 3 along a line (to be referred to as an X-ray path) connecting the X-ray source 1 and the respective radiation detecting cells forming an ionization chamber. The detected energy is discharged by a discharging ciurcuit of a predetermined time constant and this discharging time is obtained as the X-ray absorption data.

The resolution therefore depends upon the number of radiation detecting cells constituting the radiation detector per unit length along the direction of their arrangement, and also on the precision (the width of the electrodes and the pitch of their arrangement). In general, the radiation detecting cells are capable of simultaneously obtaining several hundred pieces of X-ray absorption data. As shown in FIG. 1, the radiation detecting cells are arranged parallel to the X-ray path in an arc-shaped box with the X-ray source being positioned at the center of the arc. Xenon gas or the like is sealed within the box. Thus, as shown in FIG. 2, high-voltage electrodes 22 and signal absorption electrodes 23 are alternately arranged in a box body 2 with a predetermined spacing therebetween to be parallel to the respective X-ray paths of the X-ray beam FX, and radiation detecting cells 20 are formed between these electrodes.

As has been described earlier, the CT device calculates the composition of the scanning section from the positional relationship between the opposing X-ray source and the radiation detector and from the X-ray absorption of the X-ray absorbing material interposed therebetween. Therefore, correct X-ray absorption data may not be obtained if the position precision of the pitch of the high-voltage electrodes 22 and the signal absorption electrodes 23 is not high.

The radiation detector usually constitutes several hundred radiation detecting cells in order to increase the data within the limited divergent beam for higher spatial position resolution. Since the spacing between the respective electrodes 22 and 23 constituting the radiation detecting cells is as short as several hundred microns, advanced techniques are required to keep the mechanical precision of the electrode inserting grooves high.

According to the current technique which is usually adopted, as shown in FIG. 3, an electrode supporting base plate is used which is obtained by forming with a machine tool or the like grooves 24*a* of a predetermined spacing in an insulator 24 of plate shape and made of ceramic or the like. Two such electrode supporting base plates are paired in such a manner that their sides with the grooves 24*a* oppose each other, and the upper and lower ends of the high-voltage electrodes 22 and the signal absorbing electrodes 23 are alternately inserted in the grooves. The parts of the electrodes 22 and 23 inserted in the grooves 24*a* are adhered with an adhesive 25 such as epoxy resin.

A single block of the electrode supporting base plate may be housed within an arc-shaped box body 21. However, in general, small blocks each containing several tens of electrodes are housed within the box body 21 so that only damaged parts of the structure need be replaced.

The electrode supporting base plate corresponding to one block includes, for example, 100 grooves of 200$\mu$ width with a pitch of 60$\mu$ and thus is a product of high density which requires high precision. An error margin of less than 1 to 2$\mu$ is necessary for the groove width and pitch, and an error greater than this results in a detector which may not be usable. Since generally 26 blocks of the electrode supporting base plate are used for one detector, the manufacture of detectors is extremely difficult and costly due to the problem of processing precision.

SUMMARY OF THE INVENTION

It is an object of the present invention to provide a method for manufacturing an electrode supporting base plate for a radiation detector which can easily accomplish a predetermined processing precision of an electrode supporting base plate for a radiation detector and which is suitable for mass production.

In order to achieve the above and other objects, there is provided according to the present invention a method for manufacturing an electrode supporting base plate for arranging high-voltage and signal absorbing electrodes at a predetermined pitch comprising: preparing a grooved master processed with high precision from a material which allows easy processing and has a small thermal expansion coefficient; transferring the master to an elastic molding material; forming a transfer mold; molding a resin in the transfer mold.

According to the present invention, a plate of a material which allows easy processing and has a small thermal expansion coefficient such as invar (Ni-Fe alloy) and which has the same dimensions as one block of the electrode supporting base plate is grooved with high precision by an NC machine to provide a transfer master. A transfer mold of an elastic molding material is prepared by modeling the transfer master with an elastic material such as silicone rubber, polyurethane, polysulfide, or vinyl chloride. To this transfer mold is applied a mixture of a thermosetting resin, for example, an epoxy resin with a glass filler for increasing the mechanical strength, while a glass cloth is inserted in the mixture. The resin is heated for curing and formed to manufacture an electrode supporting base plate. Since the transfer mold for the electrode supporting base plate is elastic, the releasing of the mold is easy. In addition, since the transfer may be realized with the order of several microns, electrodes of better precision than the grooving precision by machining may be mass-produced. Accordingly, a multi-layered radiation detector with improved precision may be provided with these base plates.

DETAILED DESCRIPTION OF THE PREFERRED EMBODIMENTS

An embodiment of the present invention will be described with reference to FIGS. 4 to 8.

Figure 1:
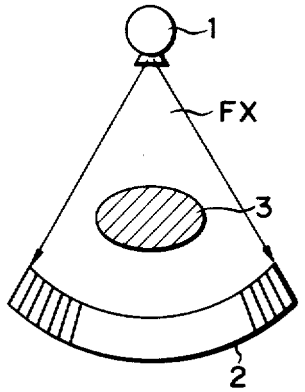
FIG. 1 is a schematic view of a CT device.
Figure 2:
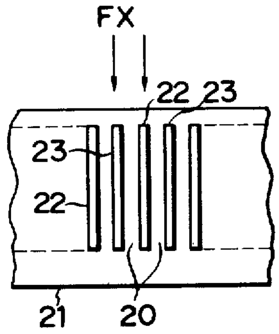
FIG. 2 is a plan view showing the schematic construction of a radiation detector used in the CT device shown in FIG. 1.
Figure 3:
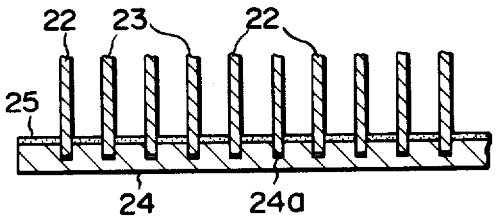
FIG. 3 is a sectional view of the radiation detector shown in FIG. 2.
Figure 4:
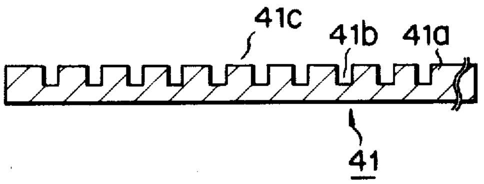
FIG. 4 is a sectional view of a master of an electrode supporting base plate according to an embodiment of the present invention.
Figure 5:
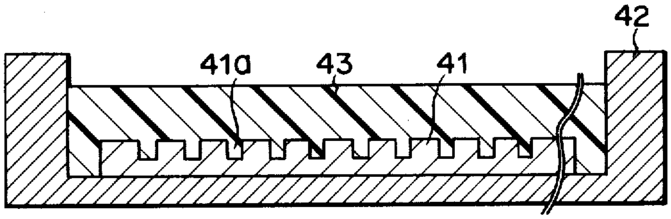
FIG. 5 is a sectional view showing the step of manufacturing a transfer mold of an elastic material from the master.
Figure 6:
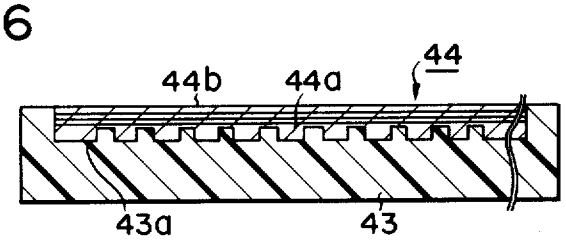
FIG. 6 is a sectional view showing the step of manufacturing an electrode supporting base plate using the transfer mold shown in FIG. 5.
Figure 7:
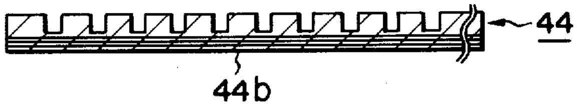
FIG. 7 is a sectional view of the electrode supporting base plate manufactured according to the step shown in FIG. 6.
Figure 8:
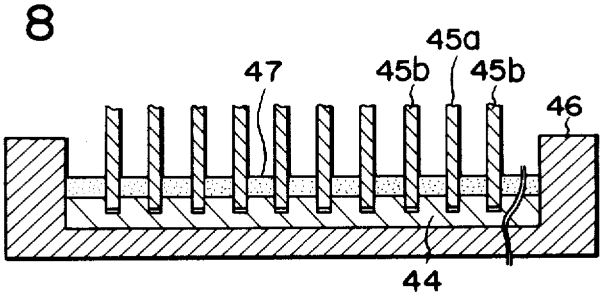
FIG. 8 is a sectional view showing the case wherein electrodes are securely attached to be integral with the electrode supporting base plate using jigs.

FIG. 4 is a sectional view showing a master 41 which is prepared by carefully machining, by an NC machine tool or the like, a material such as invar having the same shape as the electrode supporting base plate for transfer. Reference numeral 41*a* denotes a base plate part; 41*b*, electrode inserting grooves; and 41*c*, electrode pitch. The master 41 thus manufactured is placed in an outer frame 42 as shown in FIG. 5 in such a manner that its electrode inserting grooves 41*b* of the master 41 face upward. An elastic molding material is poured from above, and an elastic transfer mold 43 is prepared by controlling the temperature under this condition. The cured elastic transfer mold 43 is removed from the outer frame 42 and the master 41 is also removed. The elastic transfer mold 43 is placed in such a manner that its transferring part 43*a* faces upward as shown in FIG. 6. A mixture of a resin molding material such as an epoxy resin with glass filler 44*a* is injected to a predetermined thickness in the transferring part 43*a* while a glass fiber sheet 44*b* is inserted in the mixture in a sandwiched manner. The resin is cured by controlling the temperature to manufacture an electrode supporting base plate 44 of a molding material, as shown in FIG. 7. With this method, electrode supporting base plates of satisfactory precision may be manufactured using the same transfer mold.

Fixing of the electrodes by the molding method will now be described. The electrode supporting base plate 44 is used as a jig. After alternately inserting high-voltage electrodes 45*a* and signal detecting electrodes 45*b* in the grooves of the electrode supporting base plate 44, the electrode supporting base plate 44 is placed in an outer frame 46 for molding. Under the condition shown in FIG. 8, resin 47 is injected on the surface parts of the electrode supporting base plate 44 between electrodes 45. After curing, the electrode supporting base plate 44 with the electrodes 45 is removed from the outer frame 46. The same process is repeated for the other ends of the electrodes 45 to provide a block of box shape. With this method for the formation of grooves, an increase in the number of channels (increase in the number of grooves) may easily be accomplished. Therefore, an electrode supporting base plate of high precision having a plurality of grooves arranged at equal intervals for receiving and securely holding electrodes may be mass-produced at less cost. Therefore, multi-layered radiation detectors of high precision and less cost may be manufactured.

The present invention is not particularly limited to the embodiment described above. Various changes and modifications may be made within the scope and spirit of the present invention.

Figure 9:
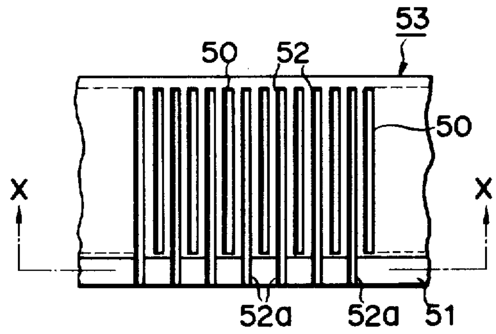
FIG. 9 is a plan view showing an electrode supporting base plate according to another embodiment of the present invention.
Figure 10:
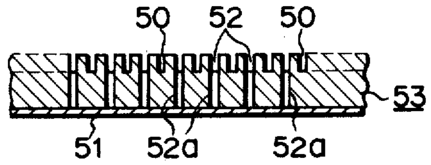
FIG. 10 is a sectional view along the line X—X of FIG. 9.

For example, only the high-voltage electrodes may be connected to a common electrode 51 as shown in FIGS. 9 and 10. Signal detecting electrode grooves 50 are formed as in the case of the first embodiment. However, only one end 52*a* of each of high-voltage electrode grooves 52 extends to the bottom (or in the vicinity thereof) of an electrode supporting base plate 53. Then, when the high-voltage electrodes are inserted in the high-voltage electrode grooves 52, they are simultaneously connected with the common electrode 51. It is apparent that this construction may be achieved with a method similar to that described with reference to FIGS. 4 to 7.

In summary, an elastic transfer mold is used to manufacture an electrode supporting base plate according to the present invention. Therefore, formation of grooves may be accomplished with a higher precision than that obtainable by grooving with a machine tool or the like. Since mass production is easy, multi-layered radiation detectors with improved precision may be manufactured at less cost by using the electrode supporting base plate manufactured according to the method of the present invention. The present invention thus provides a method for manufacturing an electrode supporting base plate for a radiation detector which results in various advantages.

What is claimed is:

1. A method for manufacturing an electrode supporting base plate for a radiation detector for alternately arranging a plurality of high voltage electrodes and signal detecting electrodes, respectively, comprising the steps of:

preparing a master of said base plate by processing with high precision a material having a small thermal expansion coefficient;

transferring a pattern of said master to an elastic molding material to prepare an elastic transfer mold; and injecting a resin in said transfer mold, curing the resin, and removing said electrode supporting base plate from said transfer mold.

2. A method according to claim 1, wherein glass filler and a glass cloth are mixed in the resin in the step of injecting the resin for said electrode supporting base plate.

3. A method according to claim 1, wherein said master is made of Ni-Fe alloy.

4. A method according to claim 1, wherein said elastic molding material is silicone rubber.

5. A method according to claim 1, wherein said resin injected in said transfer mold is a thermosetting resin.

6. A method according to claim 5, wherein said thermosetting resin is an epoxy resin.

7. A method according to any one of the preceding claims, wherein said master has high-voltage electrode grooves deeper than said signal detecting electrode grooves, said high-voltage electrode grooves for bringing said high-voltage electrodes in contact with a common electrode.

* * * * *